Figure 3:
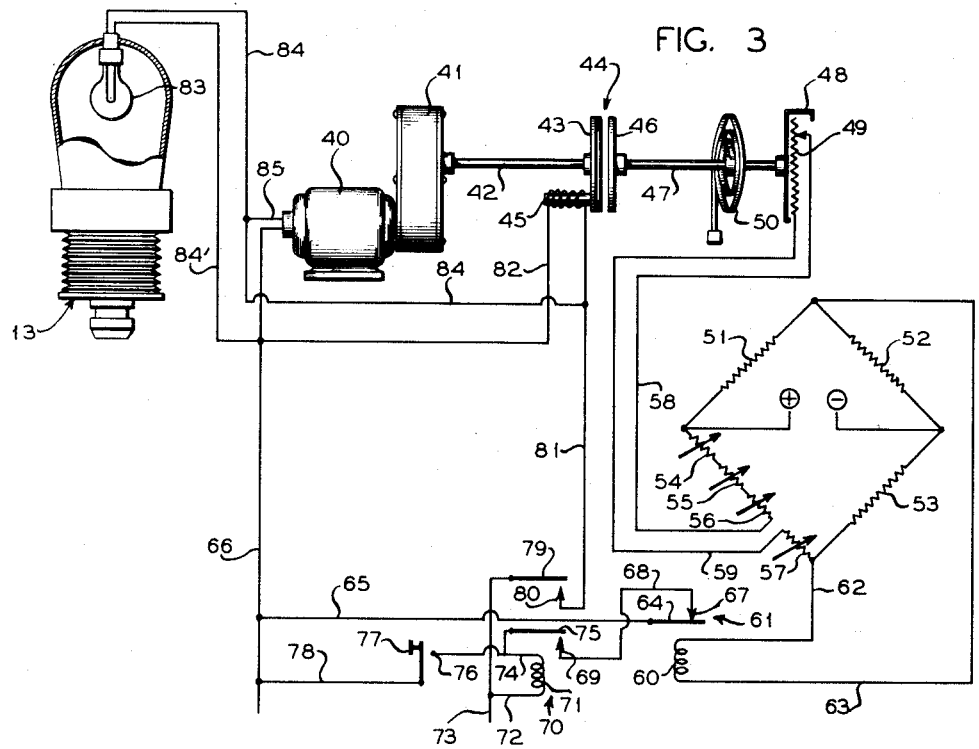

July 29, 1952 J. H. TROUP 2,605,447
ENLARGEMENT PHOTOGRAPHY
Filed July 17, 1950 2 SHEETS—SHEET 1
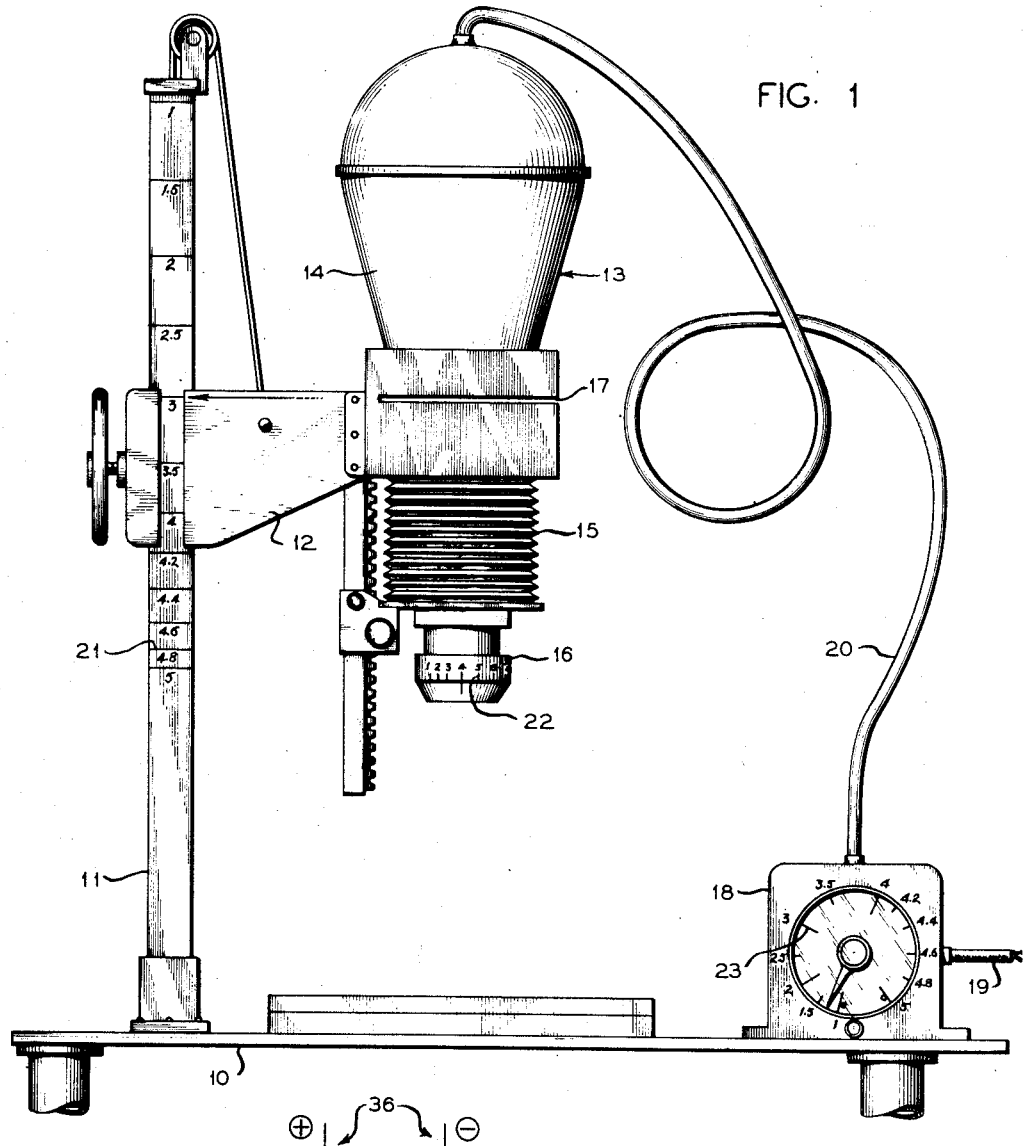
FIG. 1
FIG. 2
INVENTOR.
J. H. TROUP,
BY
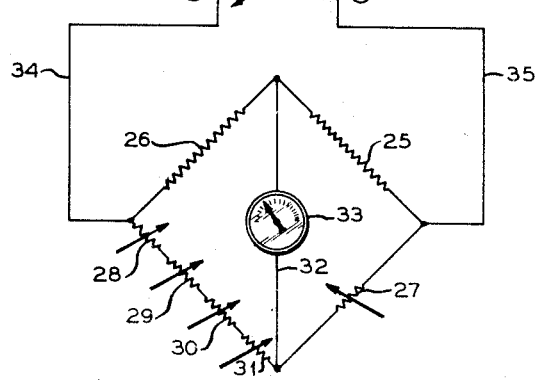
ATTORNEY July 29, 1952 J. H. TROUP 2,605,447
ENLARGEMENT PHOTOGRAPHY
Filed July 17, 1950 2 SHEETS—SHEET 2

INVENTOR.
J. H. TROUP,
BY
A. Yates Dowell
ATTORNEY

Patented July 29, 1952

2,605,447

UNITED STATES PATENT OFFICE 2,605,447

ENLARGEMENT PHOTOGRAPHY

John H. Troup, Harrisburg, Pa.

Application July 17, 1950, Serial No. 174,277

8 Claims. (Cl. 315—150)

This invention relates to photography and more particularly to the making of enlarged photographic prints from negatives.

In making photographic enlargements the negative is placed in an enlarging projector which is adapted to be adjusted the desired distance above the surface on which the printing paper is placed. A light source is positioned above the negative and the lens below in order to focus the light rays passing through the negative onto the paper. The degree of enlargement is a function of the height of the negative above the paper, the lens aperture influencing the intensity and depth of the image, and the length of time in which the light rays fall on the paper governing the exposure time. It has been found that the factors mentioned are so inter-related that a change in one usually requires a change in one or more of the others. In practice, therefore, a substantial amount of trial and error technique is employed in order to achieve the best results. This technique is further complicated by the fact that negatives vary in density, some transmitting light more easily than others. A still further factor is the processing conditions. However, these may be controlled and maintained relatively uniform.

In the contact printing of negatives, the negative is placed substantially in contact with the paper in order to make a print of the same scale as the negative. It will be understood, therefore, that in contact printing certain factors present in enlargement printing, including the height of the negative above the paper and the aperture opening, are eliminated. Thus, the only remaining factors, except for the processing conditions, which we assume to be constant, are the exposure time and the negative density. In contact printing, therefore, an operator of only small experience may by inspection determine the approximate density of a given negative and adjust the exposure time accordingly. Due to the other variable factors encountered in enlargement printing, however, even an experienced operator must experiment to arrive at a trial and error solution of the best combination of the variables.

Accordingly, it is an object of this invention to provide a method of enlargement photography by which the determination of the variables affecting the process is greatly simplified.

A further object of this invention is to provide a method and apparatus for enlargement photography in which one or more of the variable factors is automatically determined and the photographic enlarging mechanism automatically adjusted accordingly.

These and other objects of the invention become apparent from the following description taken in conjunction with the accompanying drawings in which:

Fig. 1 is an elevation of enlarging apparatus adapted for carrying out the present invention;

Fig. 2, a diagram of a bridge circuit for determining the value of one or more unknown variables.

Figure 4:
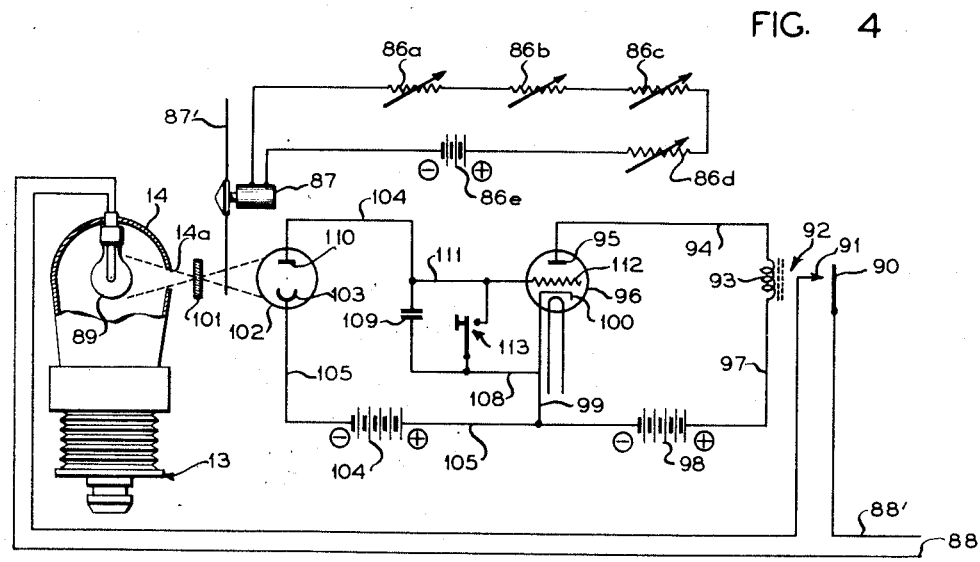

Fig. 3, a schematic diagram of apparatus including an electrical circuit for determining and governing the exposure time automatically; and Fig. 4, a schematic layout of another form of apparatus including an electrical circuit for determining and governing exposure time automatically.

In enlargement photography the equation $E=it$ shows the relationship between E, exposure, $i$, intensity, and $t$, time. However, the basic variable factors influencing exposure which are encountered in actual practice, are (1) distance from the negative to the paper, (2) aperture, (3) the printing speed of the negative, and (4) the time of exposure. The exposure given the paper is proportional to the product of these factors when they are expressed in terms of intensity and time, but the amount of exposure required by the paper in order to produce a proper image is of course dependent on the emulsion and its processing. We shall see later how it is possible to determine by test the value of this exposure required. From the above considerations, it is apparent that three factors in actual practice determine the value of "$i$" in Equation (1), we have, $$i = K i_1 i_2 i_3 \qquad (2)$$

where $i_1$ is proportional to the intensity of light at the paper as the negative to paper distance is varied and the two other intensity factors, aperture and negative printing speed, are held constant; $i_2$ is proportional to the intensity of the light at the paper as the aperture size is varied, and the distance from negative to paper and the negative printing speed are held constant; and $i_3$ is proportional to the intensity of the light at the paper due to a variation in the printing speed of negatives while the remaining two variables are held constant. We may now combine Equation (1) and Equation (2) as follows:

$$E = K i_1 i_2 i_3 t \qquad (3)$$

Because we are not interested in absolute values, we may drop K. Now, taking the logarithm of the remaining equation, we have $$\log E = \log i_1 + \log i_2 + \log i_3 + \log t \qquad (4)$$

This equation provides a useful tool in solving for the variables in enlargement photography. In order to apply it easily the physical scales on the enlarger are laid out in units corresponding to the logarithmic units in the above formula.

Referring to the drawings and particularly Fig. 1, enlargement apparatus is shown including a base 10 having an upstanding member 11 connected thereto carrying an adjustable arm 12 to which is connected an enlarging camera or projector 13. The projector has a housing 14 for the light source, and a bellows portion 15 by means of which the focal distance of the lens carrying member 16 may be adjusted. Slot 17 is provided intermediate of the housing and bellows portion for receiving a negative to be enlarged. A suitable timing device 18 is shown for receiving power through line 19 and sending it for predetermined intervals through line 20 to the source of light within the housing.

Applied to the upright member 11 is a scale 21 on which divisions are marked corresponding to the log $i_1$. Similarly, a scale 22 on the lens aperture mounting 16 has markings corresponding to the log $i_2$ and scale readings 23 on the face of the timer 18 corresponding to the log $t$. The scales may be most readily constructed from basic mathematical considerations although a photometer at the paper surface measuring the intensity of the projected light as each variable, is varied separately would serve as well for constructing scales 21 and 22. The log of the photometer intensity readings need only be placed on the scale positions to which they correspond. The time scale 23 is either exactly the log of time or it may vary from this slightly when a careful worker wishes to compensate for the reciprocity law failure. When the scales are to be constructed mathematically it can be shown that $$d = F\left[\frac{i_1}{i_1^{\frac{1}{2}} - 1}\right]$$

where $d$ is the negative to paper distance, F is the focal length of the lens and $i_1$ is proportional to the intensity of the light on the paper surface as $d$ is varied. This relationship may, of course, be used to construct scale 21. The scale 22 may also be constructed from purely mathematical considerations as $$A^2 = i_2$$

where A is the aperture size, as indicated by focal ratio and $i_2$ is proportional to the intensity of light on the paper surface as A is varied.

In order to enlarge negatives according to my invention, a given negative, which is preferably although not necessarily of average density, is enlarged by the conventional trial and error technique and is assigned an arbitrary number, such as 3 (log $i_3 = 3$), this negative now providing a standard by means of which other negatives may be rated. We then add the number which this negative has been assigned to the reading of the scales 21, 22 and 23 to determine their sum, which sum is equal to log E. This quantity is, of course, a measure of the sensitivity of the paper used and it will be influenced by the processing conditions as well as by the emulsion. Then in order to have the proper exposure for the same negative but with one or more of the other factors changed, for example, the negative to paper distance (hence magnification), it is only necessary to vary one or more of the other factors so that the sum is the same.

If a different negative is to be used, the operator, by comparison with the standard negative, may judge whether more or less exposure is required and the approximate degree thereof, in the same manner as with contact printing. Thus, by the use of my method, enlargement printing is made substantially as simple as contact printing. It is, of course, apparent that once a given negative is rated, the need for further trial and error adjustment is eliminated, as it is only necessary to adjust the other factors such that all factors including the negative rating number total the proper sum.

Although it is not essential to an understanding of this invention, it is contemplated that various modifications may be made in the scales to compensate for changes in the factors involved from simple relationships. For example, the time scale 23 may be modified to compensate for the failure of the reciprocity law by so arranging the scale that the indicator is opposite log $t$ at a certain point and that all other points indicate log $t$ plus or minus a small correction equal to the increase or decrease in log $it$ necessary to produce a constant density as $t$ is varied.

It is, of course, within the contemplation of the invention that other variables may be included in the equation and determined by suitable means. For example, if the voltage for the light source is not constant, it may be determined and included as a factor.

Instead of solving the basic equation mentally or on paper, a conventional bridge circuit may be employed, as shown in Fig. 2, in which the fixed resistances 25 and 26 are employed on two legs of the bridge, a variable resistance 27 on a third leg, and variable resistances 28, 29, 30 and 31 on the fourth leg. A galvanometer 33 is connected across the bridge by conductor 32. Suitable leads 34 and 35 extend from the opposite sides of the bridge to a power source 36. In operation the resistances 27, 28, 29, 30 and 31 may be set to correspond respectively to the variable factors log E, log $i_1$, log $i_2$, log $i_3$ and log $t$, respectively. Thus, in order to solve the equation for any given set of variables, after once determining log E, the other variables would be set into the corresponding resistances until the meter 33 gave zero reading, at which point the bridge would be balanced and the values to which the various scales would be set could then be read from the corresponding resistances.

Instead of reading certain of the values from the scales on the enlarger and setting these in the Wheatstone bridge and solving for the unknown or unknowns by manipulation of the resistances of the bridge corresponding to the unknown or unknowns, the invention contemplates the doing of this automatically by providing resistance or rheostat units with the scales of the device such that a setting of the various scales of the device would automatically set corresponding resistances of a bridge.

One specific embodiment of the invention whereby the length of time or exposure setting is automatically controlled, is shown diagrammatically in Fig. 3. The apparatus illustrated in Fig. 3 comprises a synchronous motor 40 which is adapted to drive shaft 42 through a gear reduction box 41, the speed of the motor and the reduction gearing ratio being such that the time required for one revolution of the shaft 42 is as great as the maximum exposure time contemplated. Attached to the other end of shaft 42 is one member 43 of a magnetic clutch 44, the field or solenoid of the magnetic clutch being indicated at 45. The other member 46 of the magnetic clutch is connected to shaft 47 which drives the movable member 48 of a variable impedance 49. Connected to the shaft 47 is a spiral return spring 50 which is adapted to return the shaft 47 and the impedance member 48 to its initial position when torque is not being transmitted through the magnetic clutch. The impedance 49 is so constructed that the angular distance through which the shaft 47 turns is proportional to the log $t$, or in other words, is proportional to the log of the exposure time.

The electrical circuit of Fig. 3 includes a Wheatstone bridge having fixed impedances or resistances 51, 52 and 53 on three of its legs and variable resistances 54, 55, 56 and 57 on the fourth leg, leads 58 and 59 extending from the fourth leg to the impedance 49 in order that the impedance be included in series in the leg. The variable resistances 54, 55 and 56 correspond respectively to the variable factors log E, log $i_1$, and log $i_2$, the impedance 49 corresponding to the factor log $t$. Instead of placing the resistance corresponding to the log E in another leg, as that in Fig. 2, for convenience sake, it is placed in the leg with the other variable resistances, and corresponds to the resistance 57, it being understood that the value of the respective variable resistances must be proportioned according to the value of the resistances in the other legs and to each other.

Instead of employing a meter to indicate the balance of the bridge, as in Fig. 2, or in conjunction therewith, if desired, a coil 60 of a relay 61 is connected by leads 62 and 63 to the opposite sides of the bridge. One of the contacts 64 of the relay 61 is connected by conductor 65 to one side 66 of a power line. The other contact 67 of the relay is connected by lead 68 to a contact 69 of relay 70, relay 70 including a coil 71. One lead 72 of the coil 71 is connected to the other side 73 of the power line and the other lead is connected by lead 74 to a contact 75 of the relay, and to a contact 76 adapted to engage a contact member or button 77. From the button 77 lead 78 extends to the line 66. One of the other contact members 79 of the relay 70 is connected to the line 73. The engaging contact 80 is connected to a line 81 extending to coil 45, the other end of the coil being connected by a conductor 82 to line 66.

A light source 83 in the enlarging projector has leads 84 and 84' connected to lines 81 and 66, respectively. Branching from the line 84 is a conductor 85 leading to one of the electrical connections of the motor 40, the other side of the motor being connected directly to the power line 66.

In the operation of the above circuit the variable resistances 54, 55, 56 and 57 are set in accordance with their predetermined values, the value of the resistance 57 corresponding to the log E, which is determined as previously set forth. The apparatus is then adjusted so that the negative to paper distance and the aperture opening are correct. Then, the apparatus being in readiness, the operator presses contact button 77 to close the circuit through the coil 71 of relay 70 in order to close the normally open contacts 79, 80 and 75, 69. After release of the contact button 77, the circuit through coil 71 is maintained as follows: Power line 73, conductor 72, coil 71, conductor 74, contacts 75, 69, conductor 68, contacts 67, 64 conductor 65 back to line 66. So long as the bridge is unbalanced the current flowing through coil 60 of relay 61 will hold the normally open contacts 67 and 64 closed, thus maintaining the circuit through the relay coil 71.

Simultaneously, with the closing of the manual contact button 77 the motor 40 is energized to drive the movable member 48 of the impedance 49 through the circuit as follows: Line 66, motor 40, conductors 85, 84 and 81, contacts 80, 79 and line 73. At the same time, the field coil 45 of the magnetic clutch 44 is energized through the following circuit: Line 66, conductor 82, coil 45, conductor 81, contacts 80, 79 and line 73. The light source 83 is likewise energized as follows: Line 66, conductor 84', light 83, conductors 84, 81, contacts 80, 79, and line 73.

As soon as the shaft 47 has turned to the extent that the value of the impedance 49 is sufficient to balance the bridge, current ceases to flow through coil 60 of the relay 61. When this condition is reached, the contacts 64, 67 separate, thus breaking the circuit to coil 71 of relay 70 and releasing the movable contacts associated with relay 70, thus opening the circuits to the motor 40, the coil 45 of the magnetic clutch 44, and the light 83.

Another illustration of the invention in which the exposure time is automatically governed in accordance with the values of the other factors is shown in Fig. 4. Referring thereto, variable resistances or impedances 86$a$, 86$b$, 86$c$ and 86$d$ are connected in series to a direct current source 86$e$ and to the drive 87 of a sector or variable light transmission disc 87'. The drive 87 for the disc is of the deflection meter type or galvanometer, i. e., the angular displacement is proportional to the current flow therethrough. Thus, the angular displacement of the sector disc will vary as a function of the total value of the resistances. The function resistances may be set to correspond to the log values of the factors heretofore mentioned which were set into the impedance bridge previously discussed.

The remainder of the circuit shown in Fig. 4 includes power lines 88 and 88' to the light 89, and including normally open contacts 90 and 91 of the relay 92 in line 88'. Relay 92 has a coil 93 one end of which is connected to conductor 94 leading to plate 95 of vacuum tube 96. The other end of the coil 93 is connected by conductor 97 through direct current source 98 to conductor 99 to the cathode 100 of the tube.

The shell 14 of the enlarger is provided with an aperture 14$a$ through which a beam of light from the light source 89 may be transmitted through filter 101 and sector disc 87' onto phototube or cell 102. The phototube 102 is of the type which transmits current therethrough as a function of the intensity of the light falling thereupon. In other words, its effective resistance decreases as the intensity of the light it receives increases. The cathode 103 of the phototube is connected in series with a source of direct power 104 and by conductors 105 and 99 to cathode 100 of the vacuum tube 96. A branch conductor 108 extends from the conductor 99 to a condenser 109 in series with the anode 110 of the phototube 102. Branch conductor 111, which is connected to the line 109 between the condenser and the member 110, is attached to the grid 112 of the vacuum tube, a manually depressible contact member 113 being connected across conductors 108 and 111 in order to bridge these when desired.

In order to operate the apparatus just described, log values of the factors, except exposure time, are set into the corresponding resistances 86a, 86b, 86d and 86c. The operator then depresses the contact 113 which discharges condenser 109 to permit flow through vacuum tube 96 and coil 93 of relay 92 to close contacts 90 and 91 of the relay and permit the light 89 to be energized. The charging rate of the condenser 109 after release of contact 113 is controlled by the amount of light received by the phototube from the light 89 through the sector disc 87' the transmission of light of the sector disc being determined by its angular displacement, as determined by the total resistance of the variable resistances. When charging has progressed such that the negative potential of the grid 112 of the vacuum tube 96 reduces the current flowing through the coil 93 of relay 92 below a critical value, the contacts 90 and 91 thereof open the circuit to the light 89.

Among the advantages of this arrangement is that voltage variations are compensated for automatically by variations in the output of the light source 89.

While an embodiment of the invention described in connection with Figs. 3 and 4 have, for illustrative purposes, been described for use with apparatus for automatically determining and controlling the time exposure factor, the invention contemplates that the other factors as well may be suitably controlled. It is apparent that the control in Fig. 3 could be used for determining the other unknown factors. Furthermore, the control means shown in Fig. 3, centered around the condition of balance or unbalance of the Wheatstone bridge, could easily be used to control means such as a motor for automatically adjusting the exposure time, aperture size, or other variables.

It will be obvious to those skilled in the art that various changes may be made in this invention without departing from the spirit and scope thereof and, therefore, the invention is not limited to that which is shown in the drawings and described in the specification, but only as indicated in the appended claims.

What is claimed is:

1. An apparatus for controlling the length of time that current flows to a source of light, comprising a Wheatstone bridge having a plurality of variable impedances, one of which may be varied by means of a shaft turned by a motor, said motor driving said shaft through a gear-reduction means and a magnetic clutch means, said magnetic clutch means, said motor, and said light source each having at least one circuit-completing lead in series with a normally open relay, unbalance responsive means for the Wheatstone bridge for holding closed a normally open circuit to said relay, and means for initially closing the circuit to said relay, whereby after initial closing of the circuit to said relay the magnetic clutch, the motor, and the light source will be energized, the motor rotating the shaft and varying the one variable impedance until the Wheatstone bridge is balanced, the means holding the normally open circuit to the relay-closed being de-energized when this condition occurs.

2. An apparatus for controlling the length of time that current flows in a circuit controlling a variable factor of a photographic enlarger, comprising a Wheatstone bridge having a plurality of variable impedances, one of which may be varied by means of a shaft turned by a motor, said circuit for controlling the variable factor having a circuit completing lead in series with a contact of a first pole of a double pole single throw normally open relay, unbalance responsive means for the Wheatstone bridge for holding closed a normally open circuit to a contact of a second pole of said relay, means for initially actuating said relay for closing said first and second poles, one of said poles of said relay being in series with the coil thereof whereby the relay may be initially closed and will remain closed until the unbalance responsive means of the Wheatstone bridge causes it to open.

3. An apparatus for controlling the time interval that current flows to a light source, comprising a deflection meter in circuit with one or more variable impedances and a power source, the deflection of the meter being governed by the impedance in circuit therewith, the impedance being a function of the desired time interval, a variable light transmission disc connected to the meter such that its angular deflection is proportional to the desired time interval, the light source being positioned to transmit light through the variable transmission disc, a light responsive cell positioned to receive light from the light source through the variable transmission disc, a lead for the light source having a normally open relay in circuit therewith, a condenser in circuit with the light responsive cell and with a source of power, a multiple-element vacuum tube having the control for the normally open relay in its plate circuit, one side of the condenser being connected to the grid and the other to the cathode of the vacuum tube, manually operable means for shunting the condenser, whereby upon temporarily shunting the condenser the plate circuit of the vacuum tube operates the relay to close the circuit to the light source, and upon release of the shunting means the condenser charges at a rate controlled by the amount of light received by the cell through the variable transmission disc, the plate current falling below the required amount to maintain the relay closed when the condenser acquires a predetermined charge.

4. An apparatus for controlling the time interval that current flows to a light source, comprising a deflection meter in a first circuit with means responsive to factors governing the time interval, a variable light transmission disc connected to the meter such that its angular deflection is a function of the time interval, the light source being positioned to transmit light through the variable transmission disc, means positioned to receive light from the light source passing through the variable transmission disc and to vary the flow of current in a second circuit, a lead for the light source having normally open contacts in series therewith, a condenser in the second circuit, a third circuit comprising the plate circuit of a multiple element vacuum tube and having means for closing the normally open contacts, the condenser being connected to the grid and the cathode of the vacuum tube, and means for shunting the condenser whereby upon shunting the condenser the plate circuit may close the normally open contact to the light source to permit the second circuit to charge the condenser upon opening the shunting means and whereby the plate circuit will cease to hold open the normally open contacts upon a predetermined charge being established on the condenser.

5. An apparatus for controlling the length of time that current flows in a first circuit controlling a variable factor of a photographic enlarger, comprising a plurality of variable impedances connected in a second circuit to a circuit controlling means indicative of the sum of the impedances, manually operable means for initiating flow in the first circuit, said manually operable means simultaneously initiating flow in a third circuit, the flow in said third circuit being determined by the circuit controlling means, and means for interrupting flow in said first circuit, said means being controlled by flow in said third circuit.

6. An apparatus for controlling a photographic operation comprising a light source and means to supply power to said light source, a Wheastone bridge having a plurality of variable resistances in one leg thereof, a motor for varying one of said variable impedances, a manual switch for initiating operation of said motor, means controlled by a condition of unbalance of said Wheatstone bridge for continuing the supply of power to said motor, said means becoming inoperative upon said Wheatstone bridge becoming balanced to stop the supply of power to said motor, said means also controlling the supply of power to said light source whereby when said motor stops said power to said light source is stopped.

7. An apparatus for controlling the exposure of a photographic material comprising, a Wheatstone bridge, a plurality of variable impedances in one leg of said bridge corresponding to variable factors of photography, an electric motor for controlling the operation of one of said variable impedances, an electric light for exposing the photographic material, a source of electricity, circuits connecting the source of electricity, said light source, and said motor for operating the same, manual switch means for initiating operation of said motor and said light simultantously a source of electricity for said Wheatstone bridge, a coil connected to said Wheatstone bridge and actuated by a condition of unbalance of said bridge, a normally open switch operated by said coil for controlling the flow of electricity to said motor and said lamp, and means to return said motor operated resistance to initial condition upon stoppage of said motor and lamp.

8. An apparatus for controlling a photographic operation comprising a motor, a solenoid operated clutch driven by said motor, and a variable impedance controlled by said clutch, a lamp, and a source of electrical energy, a circuit for supplying electrical energy to said motor, lamp and said clutch, a Wheatstone bridge having said variable impedance in one leg thereof, a source of electricity for said bridge and a solenoid controlled switch controlled by said bridge in response to a condition of unbalance of said bridge, said solenoid controlled switch being in control of said motor, lamp, and clutch, and a manual switch for initiating the operation of said motor, clutch and lamp, said solenoid controlled switch thereafter controlling the circuits to stop said motor, render said clutch inoperative, and shut off said lamp after a predetermined interval, and means to return said variable impedance to its starting condition.

JOHN H. TROUP.

REFERENCES CITED

The following references are of record in the file of this patent:

UNITED STATES PATENTS

| Number | Name | Date |
| --- | --- | --- |
| 1,930,137 | Twyman | Oct. 10, 1933 |
| 2,090,825 | Anthony | Aug. 24, 1937 |
| 2,143,692 | Haar | Jan. 10, 1939 |
| 2,149,250 | Bing | Mar. 7, 1939 |
| 2,201,606 | Bing | May 21, 1940 |
| 2,434,157 | Heppeard | Jan. 6, 1948 |